Nov. 2, 1943.  F. L. ALBEN  2,333,504
MIDGET LOCOMOTIVE
Filed June 28, 1940  3 Sheets-Sheet 1
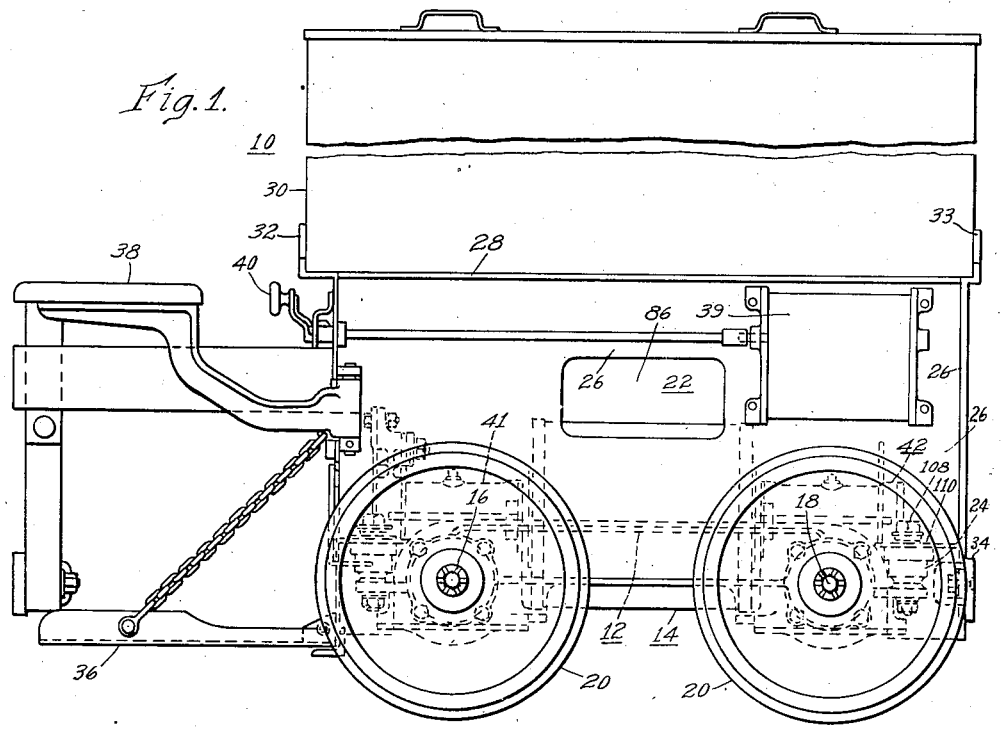
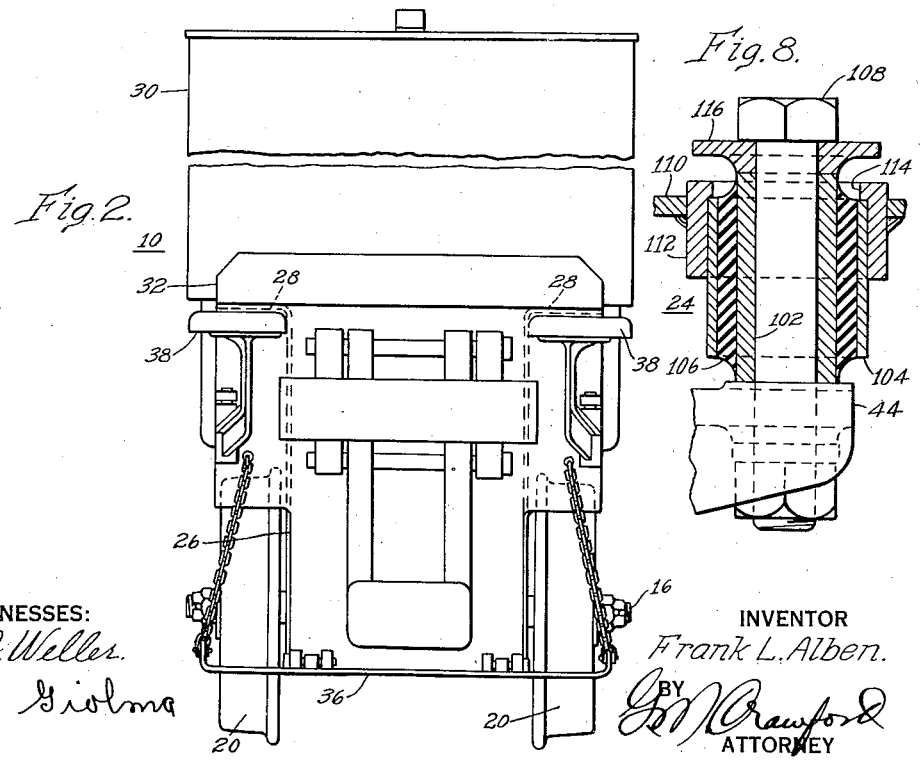
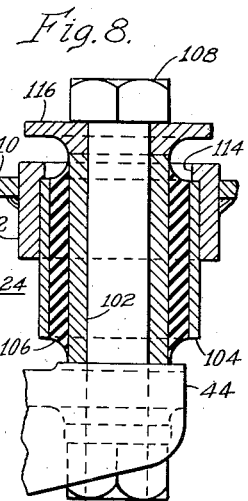
WITNESSES:
C. J. Weller
G. V. Giolma
INVENTOR
Frank L. Alben.
BY
G. M. Crawford
ATTORNEY Nov. 2, 1943.  F. L. ALBEN  2,333,504
MIDGET LOCOMOTIVE
Filed June 28, 1940  3 Sheets-Sheet 2

WITNESSES:
C. J. Weller.
F. V. Giolma

INVENTOR
Frank L. Alben.
BY G. D. Crawford
ATTORNEY

Nov. 2, 1943.　　　　F. L. ALBEN　　　　2,333,504
MIDGET LOCOMOTIVE
Filed June 28, 1940　　　　3 Sheets-Sheet 3
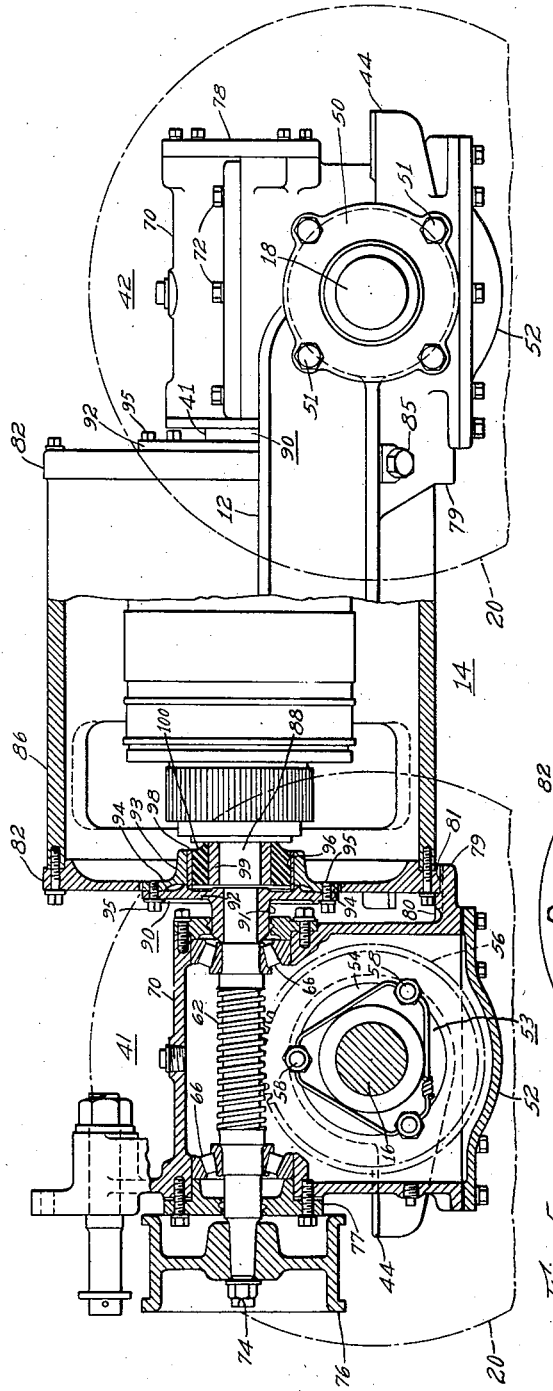
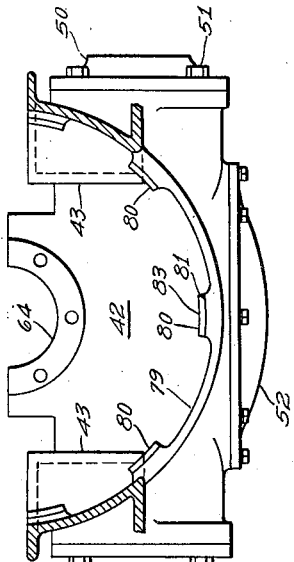
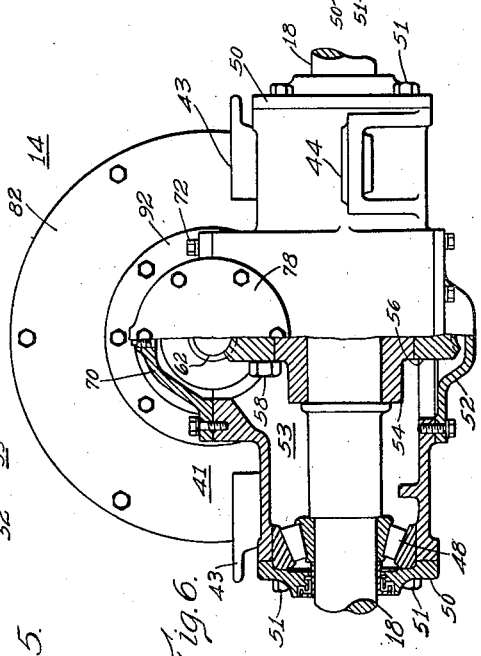
INVENTOR
*Frank L. Alben.*
BY
*G. M. Crawford*
ATTORNEY Patented Nov. 2, 1943

2,333,504

UNITED STATES PATENT OFFICE 2,333,504

MIDGET LOCOMOTIVE

Frank L. Alben, Pittsburgh, Pa., assignor to Westinghouse Electric & Manufacturing Company, East Pittsburgh, Pa., a corporation of Pennsylvania Application June 28, 1940, Serial No. 342,907

7 Claims. (Cl. 105—50)

My invention relates, generally, to electrically propelled railway vehicles, and it has reference in particular to midget locomotives of the storage battery type.

Generally stated, it is an object of my invention to provide a midget locomotive of simple and practical construction which may be readily and economically manufactured.

More specifically, it is an object of my invention to provide for rigidly connecting the front and rear axle housings of a midget locomotive so as to form a cradle for receiving a common driving motor and provide a substantially rigid subframe on which the main frame of the locomotive may be resiliently mounted.

Another object of my invention is to provide for resiliently supporting the battery box of a locomotive on a rigid subframe structure having front and rear axle housings rigidly attached thereto with a driving motor supported therebetween.

A further object of my invention is to provide for operatively connecting a common driving motor to the axles of a locomotive by positioning the motor between rigidly connected housings in which the axles are mounted and connecting it by means of resilient coupling members to coaxial drive shafts connected in geared relation to the axles.

Yet another object of my invention is to provide for resiliently mounting the main frame of a railway vehicle on a rigid subframe, having integrally connected front and rear axle housings with a common driving motor positioned in a cradle therebetween, by means of a plurality of resilient support members.

In accordance with my invention a simple and efficient lightweight or midget storage battery locomotive may be provided by rigidly connecting a pair of front and rear axle housings by rigid side members so as to maintain them in predetermined spaced relation and provide a substantially rigid subframe having a cradle for receiving the driving motor for the axles. Gear members may be positioned on the axles within the housing and a driving connection had therewith by means of worm gear drive shafts which may be connected to the motor by flexible coupling members. The drive shafts may be secured in the housings by means of removable cover plates so that the driving motor and drive shafts may be readily removed as a unit. A structural frame having plate steel sides and end members may be supported on the subframe by means of resilient support members interposed between the frame and the subframe to provide for supporting the necessary storage batteries, control equipment for the motor and the operator's platform and seat.

For a more complete understanding of the nature and scope of my invention, reference may be had to the following detailed description and the accompanying drawings, in which:

Figure 1 is a side elevational view of a locomotive embodying the principal features of the invention;

Fig. 2 is a front end elevational view of the locomotive of Fig. 1;

Fig. 5 is a slightly enlarged side elevational view, partly in section, of the motor and subframe assembled;

Fig. 6 is a slightly enlarged end elevational view, partly in section, of the motor and subframe assembly;

Fig. 7 is a cross-sectional view of the subframe along the line VII—VII of Fig. 4, and Fig. 8 is an enlarged elevational view in section of a resilient support member connecting the frame and the subframe.

Figure 3:
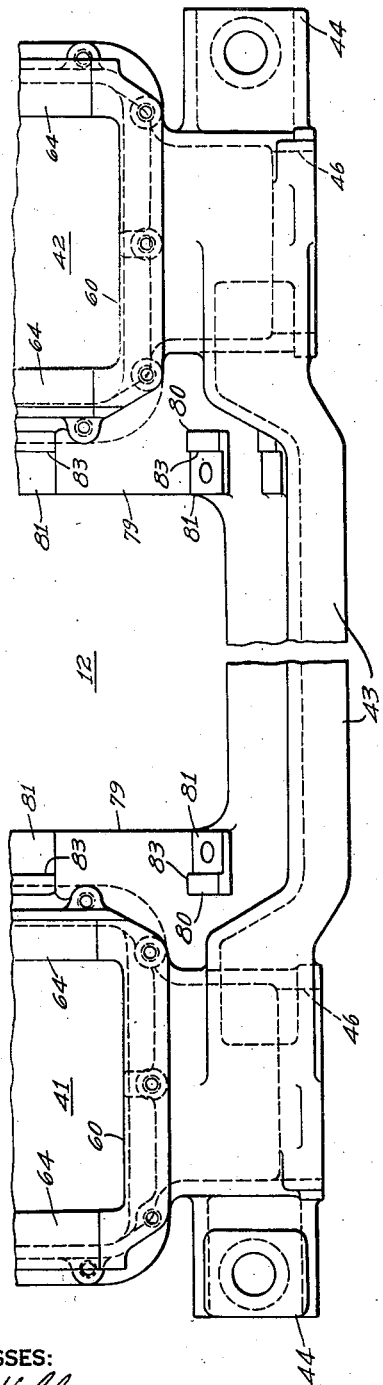
Fig. 3 is an enlarged half plan view of the subframe along one side of the longitudinal axis thereof.

Referring to Figs. 1 and 2 of the drawings, the reference numeral 10 may denote generally a lightweight or midget type of storage battery locomotive such as may be used in mines or other industrial applications. The locomotive may comprise generally a substantially rigid subframe 12, having a motor indicated generally by the numeral 14 mounted therein for driving the front and rear axles 16 and 18, respectively, to which the wheels 20 may be secured. A main frame structure indicated generally by the numeral 22 may be resiliently supported on the subframe 12 by suitable means such as, for example, the resilient support members 24, which may be interposed therebetween.

The main frame structure may be of any suitable construction, comprising, for example, a structural frame having side members 26 which may be provided with outwardly turned portions 28 at the upper edges for supporting a battery box 30, and front and rear end members 32 and 33, respectively, which may be fashioned from steel plate and secured together in any suitable manner, such as by welding.

A suitable coupling member 34 may be provided on the subframe at the rear end, and a drivers platform 36 and seats 38 connected to the main frame at the front end. A controller 39 for the motor 14 may be mounted on one side of the side members 26 and provided with an operating handle 40.

Figure 4:
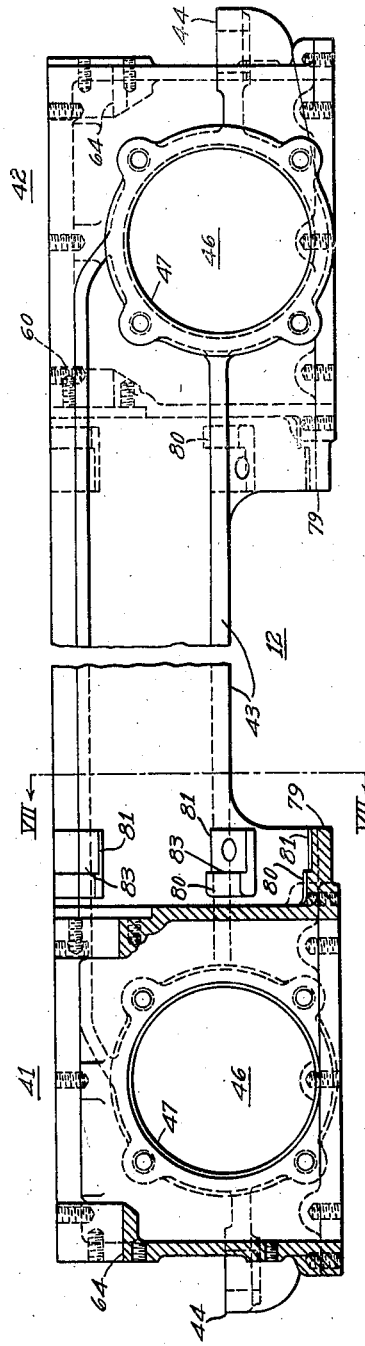
Fig. 4 is an enlarged side elevational view, partly in section of the subframe.

Referring particularly to Figs. 3 through 7, it may be seen that the subframe may comprise, generally, front and rear axle housings 41 and 42, respectively, connected to provide a substantially rigid subframe by means such as the flanged side members 43 which may be integral with the housings or otherwise rigidly secured thereto, to provide an open cradle therebetween for receiving the driving motor 14. Suitable means may be provided on the subframe for supporting the resilient support members 24 thereon, such as, for example, the projecting support members 44, which may be positioned on the housings at the ends.

The housing may be provided with suitable openings 46 in the sides thereof for receiving the axles 16 and 18, which may be rotatably supported therein by means of suitable bearings. For example, the peripheries of the openings may be machined to provide alined surfaces 47 for supporting the axle bearings 48, which may be secured in place by means of bearing caps 50 and bolts 51. The lower sides of the housings may be relatively open, and may be provided with covers 52 which form oil pans for the housings.

In order to provide for driving the axles 16 and 18 suitable gear members indicated generally by the numeral 53 may be mounted thereon, comprising, for example, hub members 54 of sufficiently small diameter to pass through the openings 46 and secured to the axles in any suitable manner, and toothed gear rims 56, which may be positioned on the hubs and secured thereto detachably by means of peripherally spaced bolts 58.

The axle housings 41 and 42 may be provided with openings 60 in the upper sides thereof and suitable means for supporting worm gear drive shafts 62 therein in driving relation with the gear members 53. For example, substantially open, semi-circular bearing seats 64 may be provided adjacent each end of the openings 60 for receiving the bearings 66 of the worm gear drive shafts 62. Suitable means may be provided for securing the bearings in the bearing seats, such as the removable covers 70, which may be secured over the openings 60 by means of bolts 72 to retain the drive shafts 62 in driving relation with the gear members 53. Either or both of the drive shafts 62 may be provided with an extension 74 on which a pulley 76 may be mounted to provide braking means for the locomotive. Bearing caps 77 and 78 may be provided at the outer ends of the drive shafts to seal the bearings.

In order to assist in positioning the motor 14 in the cradle between the housings and side members, suitable means may be provided, such as the curved flange members 79 which may extend between the side members 43 on the inwardly facing ends of the axle housings, and be integral therewith. Support pads 80 may be provided on the upper surfaces of the flange members and the inner surfaces of the side members adjacent the ends thereof, which may be readily machined to provide support surfaces 81 for engaging the peripheral surface of the motor end plates 82, and shoulders 83 for engaging the end surfaces thereof. The motor 14 may be secured in the cradle by bolts 85 which pass through the flange members into the motor frame 86.

With a view to connecting the armature shaft 88 of the motor 14 to the worm gear drive shafts 62 and correcting for any slight misalignment therebetween, means such as the resilient coupling members 90 may be provided. For example, hub members 91 having radial flanges 92 may be secured to the motor ends of the drive shafts. Complementary hub members 93 may be provided having radial flanges 94 which may be connected to the flanges 92 by means of bolts 95, and central openings 96 of somewhat greater diameter than the armature shaft 88. Driving connection with the armature shaft 88 may be secured by means of resilient torque members interposed therebetween. For example, outer metallic cylinders 98 may be secured in the central openings 96, and inner metallic cylinders 99 may be secured to the ends of the armature shaft 88. Between the cylinders may be interposed a cylindrical rubber bushing 100, having surface union therewith, such as by being vulcanized thereto.

Referring particularly to Figs. 1 and 8 of the drawings, it may be seen that the resilient support members 24 connecting the main frame 22 to the subframe 12 may, for example, comprise concentric inner and outer metallic cylinders 102 and 104, having cylindrical rubber bushing 106 interposed therebetween and having surface union therewith. The inner metallic cylinders 102 may be secured to the subframe 12 by means such as the bolts 108, which pass therethrough, rigidly securing the inner cylinders to the support members 44 on the outer end of the housings. Suitable means may be provided on the main frame 22 for providing operating connections with the outer cylinders of the support members. For example, bracket members 110 may be provided on the inner sides of the side members 26, having inverted cup members 112 secured thereto for receiving the upper ends of the outer cylinders 104. Openings 114 may be provided in the cup members to permit the upper end of the inner cylinders to pass therethrough, so as to permit movement thereof relative to the cup member. Relative movement of the main frame and the subframe may thus be transmitted to the outer and inner cylinders of the support members, movement thereof being restricted by the resistance of the rubber bushings 106 to shear. The degree of movement may be limited by means of stop washers 116 in the upward direction, and by engagement of the lower ends of the outer cylinders 104 with the support members 44 in the downward direction.

From the above description and the accompanying drawings, it will be apparent that by my invention I have provided a simple and relatively inexpensive construction for lightweight or midget locomotives. Motor drive troubles due to misalinement of the axle housings are eliminated as is also the additional expense heretofore incurred in providing either relatively complicated floating drives and/or resiliently mounted axle bearing journals. The motor and worm gear drive shafts may be readily removed as a unit from the subframe for purposes of inspection or repair merely by removing the bolts securing the housing covers to the housings and the bolts securing the motor in the cradle. The motor is securely mounted in a protected position, yet is readily available for servicing.

Since certain changes may be made in the above description, and different embodiments of the invention may be made without departing from the spirit thereof, it is intended that all the matter contained in the above description or shown in the accompanying drawings, shall be considered as illustrative, and not in a limiting sense.

I claim as my invention:

1. A locomotive structure comprising, a cradle for supporting a motor and having a housing for an axle rigidly connected therewith adjacent each end, each housing being provided with an integral support flange for connection to the motor, a frame positioned about and substantially surrounding the cradle and housings, and resilient support means interposed between the frame and the housings.

2. The combination in a structure for an electrically-operated railway vehicle having a pair of wheel axles with a common driving motor, of a subframe comprising a pair of housings for the wheel axles rigidly connected together in spaced relation by integral side members and provided with integral arcuate flanges arranged in opposed relation to form a substantially open cradle for receiving the driving motor, a main frame positioned about and substantially enclosing the subframe to support a plurality of storage batteries for supplying electrical energy to the motor, and resilient support means on the subframe for supporting the main frame.

3. In a storage battery locomotive having a pair of wheel axles with a common driving motor, in combination, a main frame for supporting a plurality of storage batteries, a subframe member positioned within the main frame comprising a pair of axle housings rigidly connected together and provided with oppositely disposed arcuate flanges forming a cradle for the common driving motor, and a plurality of resilient support members interposed between the main frame and the subframe.

4. A battery locomotive comprising, a pair of axle housings having main axle bearings for supporting a pair of axles and drive shaft bearings for positioning a pair of drive shafts in driving relation with the said axles, a motor positioned between the housings, resilient drive means connecting the motor and the drive shafts, and a pair of spaced side members integral with the housings between the upper and lower sides thereof extending between the housings to maintain them in predetermined relation and support the motor.

5. A railway vehicle comprising, a pair of wheel axles, an axle housing for each axle, a plurality of gears in each housing for transmitting power from a drive shaft to the wheel axle, a pair of substantially rigid flanged side members integrally connecting the housings adjacent the upper and lower sides thereof disposed between the axle housings to maintain them in predetermined relation with each other and angularly inclined to each other to provide an open cradle therebetween, a motor removably supported in the cradle, resilient coupling members connecting the motor to the drive shafts, and a vehicle frame resiliently supported by the axle housings.

6. A railway vehicle structure comprising, front and rear wheel axles, a gear mounted on each axle having a hub member secured to the axle and a toothed rim detachably secured to the hub member, a drive shaft disposed in geared relation with each of the gear members, a housing for rotatably mounting on each wheel axle having open bearing supports for removably positioning the drive shafts, a removable cover for each housing to secure the drive shaft in operating relation to the gear member, a pair of spaced apart flanged side members extending between and integral with the housings extending substantially from the top to the bottom thereof to maintain them in predetermined relation with each other and provide a relatively open cradle therebetween, and a common driving motor removably positioned in the cradle and connected in driving relation with the drive shafts by resilient coupling members.

7. The combination in a lightweight railway vehicle, of a pair of housings for axles positioned in spaced relation by integral spaced side members connected adjacent opposite ends of the housings, a motor positioned between the housings for driving connection to axles in the housings, an arcuate flange positioned adjacent the lower edge of each housing on the adjacent sides to provide a cradle for supporting the motor, and a frame structure resiliently mounted on the axle housings comprising side and end members substantially surrounding the housings and cradle.

FRANK L. ALBEN.